US009499012B2

(12) United States Patent
Nemoto

(10) Patent No.: US 9,499,012 B2
(45) Date of Patent: Nov. 22, 2016

(54) PNEUMATIC TIRE

(71) Applicant: The Yokohama Rubber Co., LTD., Minato-ku, Tokyo (JP)

(72) Inventor: Masayuki Nemoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/406,522

(22) PCT Filed: Jan. 10, 2014

(86) PCT No.: PCT/JP2014/050385
§ 371 (c)(1),
(2) Date: Dec. 8, 2014

(87) PCT Pub. No.: WO2014/115589
PCT Pub. Date: Jul. 31, 2014

(65) Prior Publication Data
US 2015/0136288 A1 May 21, 2015

(30) Foreign Application Priority Data

Jan. 23, 2013 (JP) .................................. 2013-010463

(51) Int. Cl.
*B60C 11/03* (2006.01)
*B60C 11/12* (2006.01)

(52) U.S. Cl.
CPC ............ *B60C 11/03* (2013.01); *B60C 11/0306* (2013.04); *B60C 11/1236* (2013.04);
(Continued)

(58) Field of Classification Search
CPC ............... B60C 11/0309; B60C 1/0306; B60C 11/03; B60C 2011/0365; B60C
(Continued)

(56) References Cited

U.S. PATENT DOCUMENTS 6,076,579 A * 6/2000 Matsumoto .............. 152/209.15
6,220,321 B1 * 4/2001 Yoshioka et al. ........ 152/209.18
(Continued)

FOREIGN PATENT DOCUMENTS

JP H07-040714 2/1995
JP H11-028911 2/1999
(Continued)

OTHER PUBLICATIONS

Machine translation of JP2007-001484 (no date).*
(Continued)

*Primary Examiner* — Michael H Wilson
*Assistant Examiner* — Philip N Schwartz
(74) *Attorney, Agent, or Firm* — Thorpe North & Western

(57) ABSTRACT

In a pneumatic tire, the groove width of the connecting subsidiary grooves changes midway. The relationship between the groove width (W1) connecting to the circumferential main groove on the outer side in the tire width direction and the groove width (W2) connecting to the circumferential main groove on the inner side in the tire width direction satisfies the range of $0.30 \leq W1/W2 \leq 0.70$. The relationship between the groove length (L1) on the tread surface having a region of groove width (W1) and the groove length (L2) on the tread surface having a region of groove width (W2) satisfies the range of $0.25 \leq L2/L1 \leq 0.65$. Sipes are provided on the tread surface of the block-like land portions. The respective end portions of the sipes connect to a position where the groove width (W1) of the connecting subsidiary grooves changes to the groove width (W2).

16 Claims, 11 Drawing Sheets

(52) U.S. Cl.
CPC  *B60C 2011/0348* (2013.04); *B60C 2011/0353* (2013.04); *B60C 2011/0355* (2013.04); *B60C 2011/0365* (2013.04); *B60C 2011/0372* (2013.04); *B60C 2011/0388* (2013.04); *B60C 2011/0393* (2013.04); *B60C 2011/1209* (2013.04)

(58) Field of Classification Search
CPC ................. 2011/0348;B60C 2011/0353; B60C 2011/0355; B60C 2011/0372; B60C 2011/0388; B60C 2011/0393; B60C 2011/0395; B60C 2011/1209
IPC ...................................................... B60C 11/03
See application file for complete search history.

(56) References Cited

U.S. PATENT DOCUMENTS

2006/0254684 A1* 11/2006 Tamura ............... B60C 11/0306
                                                        152/209.18
2010/0096055 A1* 4/2010 Shibano .............. B60C 11/0306
                                                        152/209.25
2011/0024012 A1* 2/2011 Iwai ......................... 152/209.27
2012/0247632 A1 10/2012 Hayashi
2012/0267022 A1 10/2012 Tagashira

FOREIGN PATENT DOCUMENTS

| JP | 2007001484 A * | 1/2007 | ............. B60C 11/04 |
| JP | 2009-179109 | 8/2009 | |
| JP | 2010-126046 | 6/2010 | |
| JP | 2012-224245 | 11/2012 | |
| JP | 2012-232621 | 11/2012 | |

OTHER PUBLICATIONS

Machine translation of JP2010-126046 (no date).*
International Search Report for International Application No. PCT/JP2014/050385 dated Apr. 15, 2014, 4 pages, Japan.

* cited by examiner

| | CONVENTIONAL EXAMPLE 1 | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 |
|---|---|---|---|---|---|---|---|
| SIPE INTERSECTION POSITION | Main groove - Subsidiary groove | Sub groove (FIG. 4) | Sub groove (FIG. 3) | Sub groove (FIG. 3) | Sub groove (FIG. 3) | Sub groove (FIG. 3) | Sub groove (FIG. 3) |
| SUBSIDIARY GROOVE WIDTH W2/W1 | 1.00 | 0.30 | 0.30 | 0.70 | 0.50 | 0.50 | 0.50 |
| SUBSIDIARY GROOVE LENGTH L2/L1 | - | 0.45 | 0.45 | 0.45 | 0.25 | 0.65 | 0.45 |
| SUBSIDIARY GROOVE DEPTH D1/G1 | 0.50 | 0.25 | 0.25 | 0.25 | 0.25 | 0.25 | 0.30 |
| SUBSIDIARY GROOVE DEPTH D2/G1 | 0.50 | 0.45 | 0.45 | 0.45 | 0.45 | 0.45 | 0.65 |
| SIPE DEPTH / MAIN GROOVE DEPTH H1/G2 | 0.50 | 0.10 | 0.10 | 0.10 | 0.10 | 0.10 | 0.10 |
| GROUND CONTACT EDGE DISTANCE / NARROW GROOVE DISTANCE S2/S1 | - | - | - | - | - | - | - |
| MAIN GROOVE WIDTH A2/A1 | 1.00 | 1.00 | 1.00 | 1.00 | 1.00 | 1.00 | 1.00 |
| NARROW GROOVE WIDTH / MAIN GROOVE WIDTH A3/A1 | - | - | - | - | - | - | - |
| LAND PORTION WIDTH / MAIN GROOVE WIDTH B1/A1 | 2.0 | 2.0 | 2.0 | 2.0 | 2.0 | 2.0 | 2.0 |
| STEERING STABILITY PERFORMANCE | 100 | 105 | 105 | 107 | 107 | 105 | 105 |
| WET PERFORMANCE | 100 | 107 | 107 | 103 | 103 | 106 | 107 |
| UNEVEN WEAR RESISTANCE PERFORMANCE | 100 | 103 | 103 | 103 | 103 | 101 | 101 |
| PASS-BY NOISE REDUCTION PERFORMANCE | 100 | 101 | 101 | 102 | 102 | 101 | 101 |

FIG. 6A

| | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 | WORKING EXAMPLE 13 |
|---|---|---|---|---|---|---|---|
| SIPE INTERSECTION POSITION | Sub groove (FIG. 3) | Sub groove (FIG. 3) | Sub groove (FIG. 3) | Sub groove (FIG. 3) | Sub groove (FIG. 3) | Sub groove (FIG. 3) | Sub groove (FIG. 3) |
| SUBSIDIARY GROOVE WIDTH W2/W1 | 0.50 | 0.50 | 0.50 | 0.50 | 0.50 | 0.50 | 0.50 |
| SUBSIDIARY GROOVE LENGTH L2/L1 | 0.45 | 0.45 | 0.45 | 0.45 | 0.45 | 0.45 | 0.45 |
| SUBSIDIARY GROOVE DEPTH D1/MAIN GROOVE DEPTH D1/G1 | 0.70 | 0.45 | 0.45 | 0.45 | 0.45 | 0.45 | 0.45 |
| SUBSIDIARY GROOVE DEPTH D2/MAIN GROOVE DEPTH D2/G1 | 0.65 | 0.50 | 0.70 | 0.65 | 0.65 | 0.65 | 0.65 |
| SIPE DEPTH H1/MAIN GROOVE DEPTH H1/G2 | 0.10 | 0.10 | 0.10 | 0.15 | 0.30 | 0.25 | 0.25 |
| GROUND CONTACT EDGE DISTANCE / NARROW GROOVE DISTANCE S2/S1 | - | - | - | - | - | 0.70 | 0.90 |
| MAIN GROOVE WIDTH A2/A1 | 1.00 | 1.00 | 1.00 | 1.00 | 1.00 | 1.00 | 1.00 |
| NARROW GROOVE WIDTH / MAIN GROOVE WIDTH A3/A1 | - | - | - | - | - | 0.10 | 0.10 |
| LAND PORTION WIDTH / MAIN GROOVE WIDTH B1/A1 | 2.0 | 2.0 | 2.0 | 2.0 | 2.0 | 2.0 | 2.0 |
| STEERING STABILITY PERFORMANCE | 103 | 105 | 104 | 105 | 104 | 106 | 108 |
| WET PERFORMANCE | 108 | 106 | 107 | 107 | 109 | 108 | 106 |
| UNEVEN WEAR RESISTANCE PERFORMANCE | 101 | 102 | 101 | 102 | 100 | 102 | 102 |
| PASS-BY NOISE REDUCTION PERFORMANCE | 101 | 102 | 101 | 102 | 102 | 104 | 102 |

FIG. 6B

| | WORKING EXAMPLE 14 | WORKING EXAMPLE 15 | WORKING EXAMPLE 16 | WORKING EXAMPLE 17 | WORKING EXAMPLE 18 | WORKING EXAMPLE 19 |
|---|---|---|---|---|---|---|
| SIPE INTERSECTION POSITION | Sub groove (FIG. 3) | Sub groove (FIG. 3) | Sub groove (FIG. 3) | Sub groove (FIG. 3) | Sub groove (FIG. 3) | Sub groove (FIG. 3) |
| SUBSIDIARY GROOVE WIDTH W2/W1 | 0.50 | 0.50 | 0.50 | 0.50 | 0.50 | 0.50 |
| SUBSIDIARY GROOVE LENGTH L2/L1 | 0.45 | 0.45 | 0.45 | 0.45 | 0.45 | 0.45 |
| SUBSIDIARY GROOVE DEPTH / MAIN GROOVE DEPTH D1/G1 | 0.45 | 0.45 | 0.45 | 0.45 | 0.45 | 0.45 |
| SUBSIDIARY GROOVE DEPTH / MAIN GROOVE DEPTH D2/G1 | 0.65 | 0.65 | 0.65 | 0.65 | 0.65 | 0.65 |
| SIPE DEPTH / MAIN GROOVE DEPTH H1/G2 | 0.25 | 0.25 | 0.25 | 0.25 | 0.25 | 0.25 |
| GROUND CONTACT EDGE DISTANCE / NARROW GROOVE DISTANCE S2/S1 | 0.80 | 0.80 | 0.80 | 0.80 | 0.80 | 0.80 |
| MAIN GROOVE WIDTH A2/A1 | 1.05 | 1.15 | 1.10 | 1.10 | 1.10 | 1.10 |
| NARROW GROOVE WIDTH / MAIN GROOVE WIDTH A3/A1 | 0.30 | 0.30 | 0.20 | 0.35 | 0.30 | 0.30 |
| LAND PORTION WIDTH / MAIN GROOVE WIDTH B1/A1 | 2.0 | 2.0 | 2.0 | 2.0 | 2.5 | 3.0 |
| STEERING STABILITY PERFORMANCE | 107 | 109 | 107 | 106 | 110 | 111 |
| WET PERFORMANCE | 108 | 108 | 107 | 110 | 108 | 105 |
| UNEVEN WEAR RESISTANCE PERFORMANCE | 102 | 102 | 102 | 100 | 103 | 104 |
| PASS-BY NOISE REDUCTION PERFORMANCE | 101 | 101 | 102 | 100 | 103 | 104 |

FIG. 6C

| | CONVENTIONAL EXAMPLE 2 | WORKING EXAMPLE 20 | WORKING EXAMPLE 21 | WORKING EXAMPLE 22 | WORKING EXAMPLE 23 | WORKING EXAMPLE 24 |
|---|---|---|---|---|---|---|
| SIPE INTERSECTION POSITION | Main groove - Subsidiary groove | Sub groove (FIG. 4) | Sub groove (FIG. 3) | Sub groove (FIG. 3) | Sub groove (FIG. 3) | Sub groove (FIG. 3) |
| SUBSIDIARY GROOVE WIDTH W2/W1 | 1.00 | 0.30 | 0.30 | 0.70 | 0.50 | 0.50 |
| SUBSIDIARY GROOVE LENGTH L2/L1 | - | 0.45 | 0.45 | 0.45 | 0.25 | 0.65 |
| SUBSIDIARY GROOVE DEPTH / MAIN GROOVE DEPTH D1/G1 | 0.50 | 0.25 | 0.25 | 0.25 | 0.25 | 0.25 |
| SUBSIDIARY GROOVE DEPTH / MAIN GROOVE DEPTH D2/G1 | 0.50 | 0.45 | 0.45 | 0.45 | 0.45 | 0.45 |
| SIPE DEPTH / MAIN GROOVE DEPTH H1/G2 | 0.50 | 0.10 | 0.10 | 0.10 | 0.10 | 0.10 |
| GROUND CONTACT EDGE DISTANCE / NARROW GROOVE DISTANCE S2/S1 | - | - | - | - | - | - |
| MAIN GROOVE WIDTH A2/A1 | 1.00 | 1.00 | 1.00 | 1.00 | 1.00 | 1.00 |
| NARROW GROOVE WIDTH / MAIN GROOVE WIDTH A3/A1 | - | - | - | - | - | - |
| LAND PORTION WIDTH / MAIN GROOVE WIDTH B1/A1 | - | - | - | - | - | - |
| STEERING STABILITY PERFORMANCE | 100 | 105 | 105 | 107 | 107 | 105 |
| WET PERFORMANCE | 100 | 107 | 107 | 103 | 103 | 106 |
| UNEVEN WEAR RESISTANCE PERFORMANCE | 100 | 103 | 103 | 103 | 103 | 101 |
| PASS-BY NOISE REDUCTION PERFORMANCE | 100 | 101 | 101 | 102 | 102 | 101 |

FIG. 7A

| | WORKING EXAMPLE 25 | WORKING EXAMPLE 26 | WORKING EXAMPLE 27 | WORKING EXAMPLE 28 | WORKING EXAMPLE 29 | WORKING EXAMPLE 30 |
|---|---|---|---|---|---|---|
| SIPE INTERSECTION POSITION | Sub groove (FIG. 3) | Sub groove (FIG. 3) | Sub groove (FIG. 3) | Sub groove (FIG. 3) | Sub groove (FIG. 3) | Sub groove (FIG. 3) |
| SUBSIDIARY GROOVE WIDTH W2/W1 | 0.50 | 0.50 | 0.50 | 0.50 | 0.50 | 0.50 |
| SUBSIDIARY GROOVE LENGTH L2/L1 | 0.45 | 0.45 | 0.45 | 0.45 | 0.45 | 0.45 |
| SUBSIDIARY GROOVE DEPTH / MAIN GROOVE DEPTH D1/G1 | 0.30 | 0.70 | 0.45 | 0.45 | 0.45 | 0.45 |
| SUBSIDIARY GROOVE DEPTH / MAIN GROOVE DEPTH D2/G1 | 0.65 | 0.65 | 0.50 | 0.70 | 0.65 | 0.65 |
| SIPE DEPTH / MAIN GROOVE DEPTH H1/G2 | 0.10 | 0.10 | 0.10 | 0.10 | 0.15 | 0.30 |
| GROUND CONTACT EDGE DISTANCE / NARROW GROOVE DISTANCE S2/S1 | - | - | - | - | - | - |
| MAIN GROOVE WIDTH A2/A1 | 1.00 | 1.00 | 1.00 | 1.00 | 1.00 | 1.00 |
| NARROW GROOVE WIDTH / MAIN GROOVE WIDTH A3/A1 | - | - | - | - | - | - |
| LAND PORTION WIDTH / MAIN GROOVE WIDTH B1/A1 | - | - | - | - | - | - |
| STEERING STABILITY PERFORMANCE | 105 | 103 | 105 | 104 | 105 | 104 |
| WET PERFORMANCE | 107 | 108 | 106 | 107 | 107 | 109 |
| UNEVEN WEAR RESISTANCE PERFORMANCE | 101 | 101 | 102 | 101 | 102 | 100 |
| PASS-BY NOISE REDUCTION PERFORMANCE | 101 | 101 | 102 | 101 | 102 | 102 |

FIG. 7B

| | WORKING EXAMPLE 31 | WORKING EXAMPLE 32 | WORKING EXAMPLE 33 | WORKING EXAMPLE 34 | WORKING EXAMPLE 35 | WORKING EXAMPLE 36 |
|---|---|---|---|---|---|---|
| SIPE INTERSECTION POSITION | Sub groove (FIG. 3) | Sub groove (FIG. 3) | Sub groove (FIG. 3) | Sub groove (FIG. 3) | Sub groove (FIG. 3) | Sub groove (FIG. 3) |
| SUBSIDIARY GROOVE WIDTH W2/W1 | 0.50 | 0.50 | 0.50 | 0.50 | 0.50 | 0.50 |
| SUBSIDIARY GROOVE LENGTH L2/L1 | 0.45 | 0.45 | 0.45 | 0.45 | 0.45 | 0.45 |
| SUBSIDIARY GROOVE DEPTH / MAIN GROOVE DEPTH D1/G1 | 0.45 | 0.45 | 0.45 | 0.45 | 0.45 | 0.45 |
| SUBSIDIARY GROOVE DEPTH / MAIN GROOVE DEPTH D2/G1 | 0.65 | 0.65 | 0.65 | 0.65 | 0.65 | 0.65 |
| SIPE DEPTH / MAIN GROOVE DEPTH H1/G2 | 0.25 | 0.25 | 0.25 | 0.25 | 0.25 | 0.25 |
| GROUND CONTACT EDGE DISTANCE / NARROW GROOVE DISTANCE S2/S1 | 0.70 | 0.90 | 0.80 | 0.80 | 0.80 | 0.80 |
| MAIN GROOVE WIDTH A2/A1 | 1.00 | 1.00 | 1.05 | 1.15 | 1.10 | 1.10 |
| NARROW GROOVE WIDTH / MAIN GROOVE WIDTH A3/A1 | 0.10 | 0.10 | 0.30 | 0.30 | 0.20 | 0.35 |
| LAND PORTION WIDTH / MAIN GROOVE WIDTH B1/A1 | - | - | - | - | - | - |
| STEERING STABILITY PERFORMANCE | 106 | 108 | 107 | 109 | 107 | 106 |
| WET PERFORMANCE | 108 | 106 | 108 | 108 | 107 | 110 |
| UNEVEN WEAR RESISTANCE PERFORMANCE | 102 | 102 | 102 | 102 | 102 | 100 |
| PASS-BY NOISE REDUCTION PERFORMANCE | 104 | 102 | 101 | 101 | 102 | 100 |

FIG. 7C

PNEUMATIC TIRE

TECHNICAL FIELD

The present technology relates to a pneumatic tire with improved steering stability performance, uneven wear resistance performance, wet performance, and pass-by noise reduction performance.

BACKGROUND

Conventionally, for example in the pneumatic tire (radial tire) disclosed in Japanese Unexamined Patent Application Publication No. H11-28911A, it is an object to both reduce noise outside the vehicle and improve the wet road surface running performance. This pneumatic tire includes a tread pattern that includes a plurality of main grooves extending in the tire circumferential direction and lateral grooves intersecting the main grooves on a tread ground contact portion, and a plurality of notch grooves extending from buttress portions on the tire outer side in the shoulder portions located outer than main grooves on the outermost side to the inside of the shoulder portions and terminating in a closed manner. A half or more of the number of the notch grooves is configured so that length (L) from the ground contact edge (P) of the tread ground contact portion to the closed end is set to 50 to 90% of distance (K) from the ground contact edge (P) to the main groove on the outermost side. Note that this pneumatic tire has main grooves provided on the innermost side in the tire width direction and has lateral grooves provided in a zigzag manner in land portions located adjacent to the outer sides in the tire width direction of the main grooves, forming triangular block-like land portions.

Further, it is an object of the pneumatic tire (pneumatic tire for passenger car) disclosed in Japanese Unexamined Patent Application Publication No. H07-40714A to allow reduction of the ply steer residual component cornering force and steering wheel flow amount. This pneumatic tire has a block pattern on a tread surface that includes a plurality of main grooves that extend in the tire circumferential direction, and a multiplicity of subsidiary grooves that are arranged parallel to each other and intersect the main grooves at an inclination, forming a multiplicity of rhombic blocks. In this pneumatic tire, sipes are provided in at least rhombic blocks arranged in a ground contact center region of the tread surface, the sipes each connecting two points Q, Q' distanced from the two obtuse angle points P, P' of the rhombic block along the subsidiary groove side of the rhombic block by $0.20 \leq d/D \leq 0.50$ and $0.20 \leq d'/D \leq 0.50$ where D is the width of the block, and the angle of the sipes with respect to the tire circumferential direction is 5° or more.

The pneumatic tire of Japanese Unexamined Patent Application Publication No. H11-28911A as described above has main grooves provided on the innermost side in the tire width direction and lateral grooves provided in a zigzag manner in the land portions located adjacent to the outer sides in the tire width direction of the main grooves, forming triangular block-like land portions. Therefore, in the pneumatic tire of Japanese Unexamined Patent Application Publication No. H11-28911A as described above, the block rigidity is reduced in the center portion in the tire width direction, so the steering stability performance and the uneven wear resistance performance during high-speed traveling tends to deteriorate.

Further, in the pneumatic tires of Japanese Unexamined Patent Application Publication Nos. H11-28911A and H07-40714A as described above, the lateral grooves or the subsidiary grooves provided between the main grooves are formed with equal width. Therefore, the water drainage characteristics, in other words the wet performance, tends to be inferior in the center portion in the tire width direction.

SUMMARY

The present technology improves the steering stability performance, uneven wear resistance performance, wet performance, and pass-by noise reduction performance.

A pneumatic tire according to a first embodiment includes, on the tread surface of the tread portion, at least four rib-like land portions extending in the tire circumferential direction formed by at least three circumferential main grooves extending along the tire circumferential direction, and subsidiary grooves provided at intervals in the tire circumferential direction and connecting to the circumferential main grooves, forming block-like land portions at least in the rib-like land portions between the circumferential main groove closest to the tire equator line and the circumferential main groove located adjacent to that circumferential main groove. In the pneumatic tire, the groove width of the subsidiary grooves changes midway, the relationship between the groove width W1 connecting to the circumferential main groove on the outer side in the tire width direction and the groove width W2 connecting to the circumferential main groove on the inner side in the tire width direction satisfies the range of $0.30 \leq W1/W2 \leq 0.70$, the relationship between the groove length L1 on the tread surface having the region of groove width W1 and the groove length L on the tread surface having the region of groove width W2 satisfies the range of $0.25 \leq L2/L1 \leq 0.65$, and sipes are provided on the tread surface of the block-like land portions, the respective ends of the sipe connecting to a position where the groove width W1 of the subsidiary groove changes to the groove width W2, and to a portion in the section of the subsidiary groove having the groove width W1 between the subsidiary grooves located adjacent to each other in the tire circumferential direction.

If the positions where the subsidiary groove and the sipe connect to the circumferential main groove are the same, vertices with a substantially triangular-shape are formed therein, so, due to the reduction in rigidity of the blocks in the vicinity of the positions, the steering stability performance tends to be reduced and, in addition, uneven wear tends to occur. The closer to the tire equator line, the more significant this is. According to the pneumatic tire of the present technology, the block rigidity can be increased by moving the position of connection of the end portion of the sipe on the inner side in the tire width direction from the circumferential main groove to the subsidiary groove, so it is possible to provide a high level of steering stability performance and uneven wear resistance performance. Moreover, in the subsidiary groove, the wet performance can be improved by making the groove width W2 connecting to the circumferential main groove on the inner side in the tire width direction wider than the groove width W1. Furthermore, by making the groove width W1 connecting to the circumferential main groove on the outer side in the tire width direction narrower than the groove width W2, the groove component on the outer side in the tire width direction is reduced, and thus the pass-by noise reduction performance can be improved.

Further, the pneumatic tire according to a second embodiment is the first embodiment wherein, the relationship between the groove depth G1 of the circumferential main groove closest to the tire equator line and the groove depth D1 in the section of the subsidiary groove having the groove width W1 satisfies the range of $0.30 \leq D1/G1 \leq 0.70$, and the relationship between the groove depth G1 of the circumferential main groove closest to the tire equator line and the groove depth D2 in the section of the subsidiary groove having the groove width W2 satisfies the range of $0.50 \leq D2/G1 \leq 0.70$.

According to this pneumatic tire, by setting the groove depths D1, D2 of the subsidiary grooves shallower than that of the circumferential main grooves, the block rigidity is maintained, and it is possible to improve the steering stability performance and the uneven wear performance. By making the groove depths D1/G1 of the subsidiary grooves and the circumferential main grooves 0.30 or more, and D2/G1 0.50 or more, the groove volume is made appropriate and it is possible to obtain an effect of improving wet performance. On the other hand, by making D1/G1 and D2/G1 0.70 or less, the reduction in block rigidity is suppressed and it is possible to obtain an effect of improving steering stability performance and uneven wear performance.

Further, the pneumatic tire according to a third embodiment is the first or the second embodiment wherein, the sipe connects to an intersecting portion connecting to the circumferential main groove in the section of the subsidiary groove having the groove width W1, and the relationship between the sipe depth H1 of the sipe at the intersecting portion and the groove depth G2 of the circumferential main groove to which the sipe connects satisfies the range of $0.15 \leq H1/G2 \leq 0.3$.

According to this pneumatic tire, by making H1/G2 0.15 or more, the water drainage characteristics are improved, so it is possible to obtain an effect of improving wet performance. On the other hand, by making H1/G2 0.30 or less, the reduction in block rigidity is suppressed and it is possible to obtain an effect of improving steering stability performance.

Further, the pneumatic tire according to a fourth embodiment is any one of the first to third embodiments wherein, a circumferential narrow groove extending along the tire circumferential direction is formed between each circumferential main groove on the outermost side in the tire width direction and each ground contact edge, and the relationship between the distance S1 in the tire width direction from the tire equator line to the ground contact edge and the distance S2 in the tire width direction from the tire equator line to the center of the circumferential narrow groove satisfies the range of $0.7 \leq S2/S1 \leq 0.9$.

According to this pneumatic tire, by making S2/S1 within the above range, the proportion of the rib-like land portions on the inner side in the tire width direction in the ground contact width between the ground contact edges is increased, so it is possible to obtain an effect of improving steering stability performance.

Further, the pneumatic tire according to a fifth embodiment is any one of the first to fourth embodiments wherein, a circumferential narrow groove extending along the tire circumferential direction is formed between each circumferential main groove on the outermost side in the tire width direction and each ground contact edge, and the relationship between the groove width A1 of the circumferential main groove closest to the tire equator line and the groove width A2 of the circumferential main groove located on the outer side in the tire width direction of that circumferential main groove satisfies the range of $1.05 \leq A2/A1 \leq 1.15$, and the relationship between the groove width A1 of the circumferential main groove closest to the tire equator line and the groove width A3 of the circumferential narrow groove satisfies the range of $0.20 \leq A3/A1 \leq 0.35$.

According to this pneumatic tire, the circumferential narrow groove extending in the tire circumferential direction is formed between each circumferential main groove on the outermost side in the tire width direction and each ground contact edge, so the water drainage characteristics are improved, and it is possible to obtain an effect of improving wet performance. Further, with obtaining the effect of improving wet performance due to the circumferential narrow groove, by making the groove width A2 of the circumferential main groove located on the outer side in the tire width direction greater than the groove width A1 of the circumferential main groove closest to the tire equator line, the proportion of the rib-like land portions on the inner side in the tire width direction is increased without reducing the effect of improving wet performance, so it is possible to achieve an effect of improving steering stability performance.

Further, the pneumatic tire according to a sixth embodiment is any one of the first to fifth embodiments wherein, a rib-like land portion is provided on the tire equator line formed between the two circumferential main grooves closest to the tire equator line, and the relationship between the land portion width B1 on the tread surface of the rib-like land portion and the groove width A1 of the circumferential main groove closest to the tire equator line satisfies the range of $2.5 \leq B1/A1 \leq 3.0$.

According to this pneumatic tire, the rib-like land portion is provided formed between the two circumferential main grooves closest to the tire equator line, and by setting the land portion width B1 and the groove width A1 of the circumferential main grooves on both sides thereof as prescribed in the above range, it is possible to achieve an effect of improving steering stability performance.

Further, the pneumatic tire according to a seventh embodiment is any one of the first to sixth embodiments wherein, the pneumatic tire is applied to a pneumatic tire for a small truck with a regular inner pressure of 575 kPa or less.

Pneumatic tires for small trucks are mainly used for traveling on-site, and are subject to many repetitions of stop and go at medium and low velocities, so excellent steering stability performance, wear resistance performance, and wet performance are required, and excellent pass-by noise reduction performance is also required. According to this pneumatic tire of the present technology, it is possible to improve the steering stability performance, uneven wear resistance performance, wet performance, and pass-by noise reduction performance, so it is ideal for pneumatic tires for small trucks.

The pneumatic tire according to the present technology can improve the steering stability performance, uneven wear resistance performance, wet performance, and pass-by noise reduction performance.

BRIEF DESCRIPTION OF THE DRAWINGS

FIGS. 6A-6C include a table showing results of performance testing of pneumatic tires according to working examples of the present technology.

FIGS. 7A-7C include a table showing results of performance testing of pneumatic tires according to working examples of the present technology.

DETAILED DESCRIPTION

An embodiment of the present technology is described below in detail based on the drawings. However, the present technology is not limited to the embodiment. Further, the constituents of the embodiment include constituents that can be easily replaced by those skilled in the art or that are substantially the same as the constituents of the embodiment. Furthermore, a plurality of modified examples described in the embodiment can be combined as desired within the scope apparent to those skilled in the art.

Figure 1:
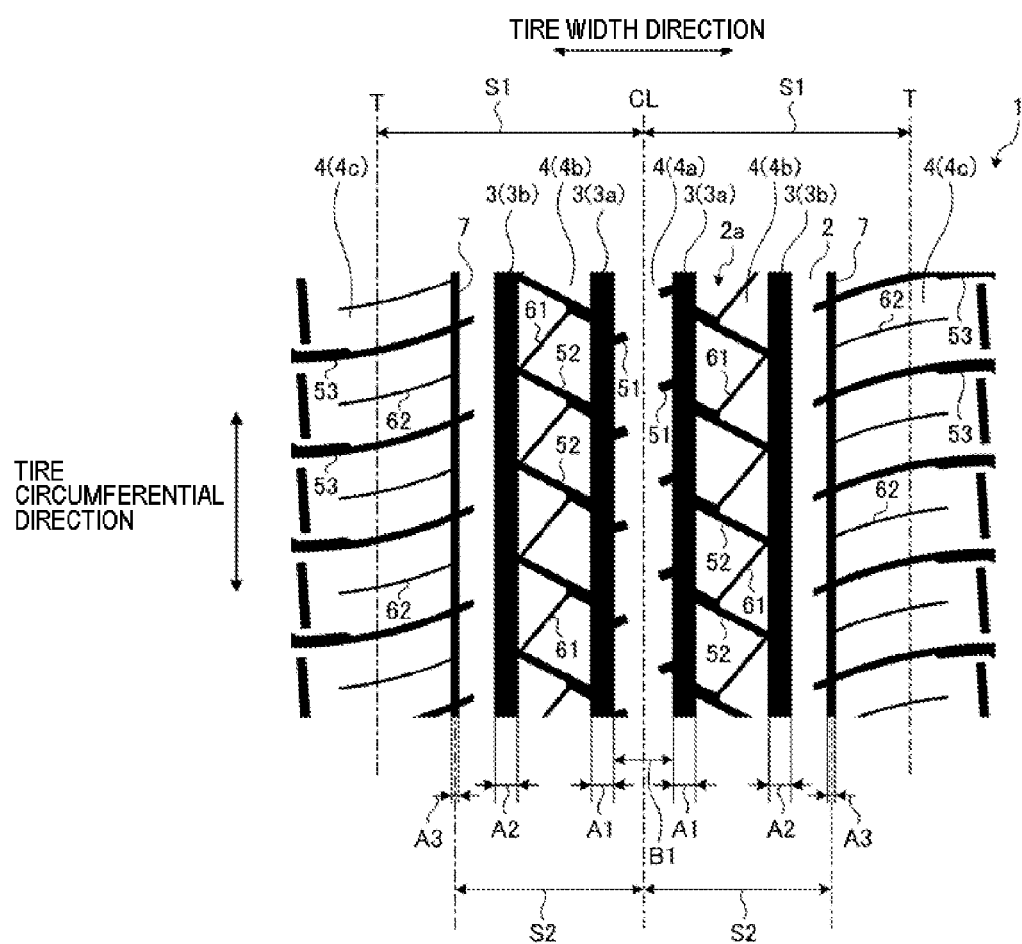
FIG. 1 is a plan view of a pneumatic tire according to an embodiment of the present technology.
Figure 2:
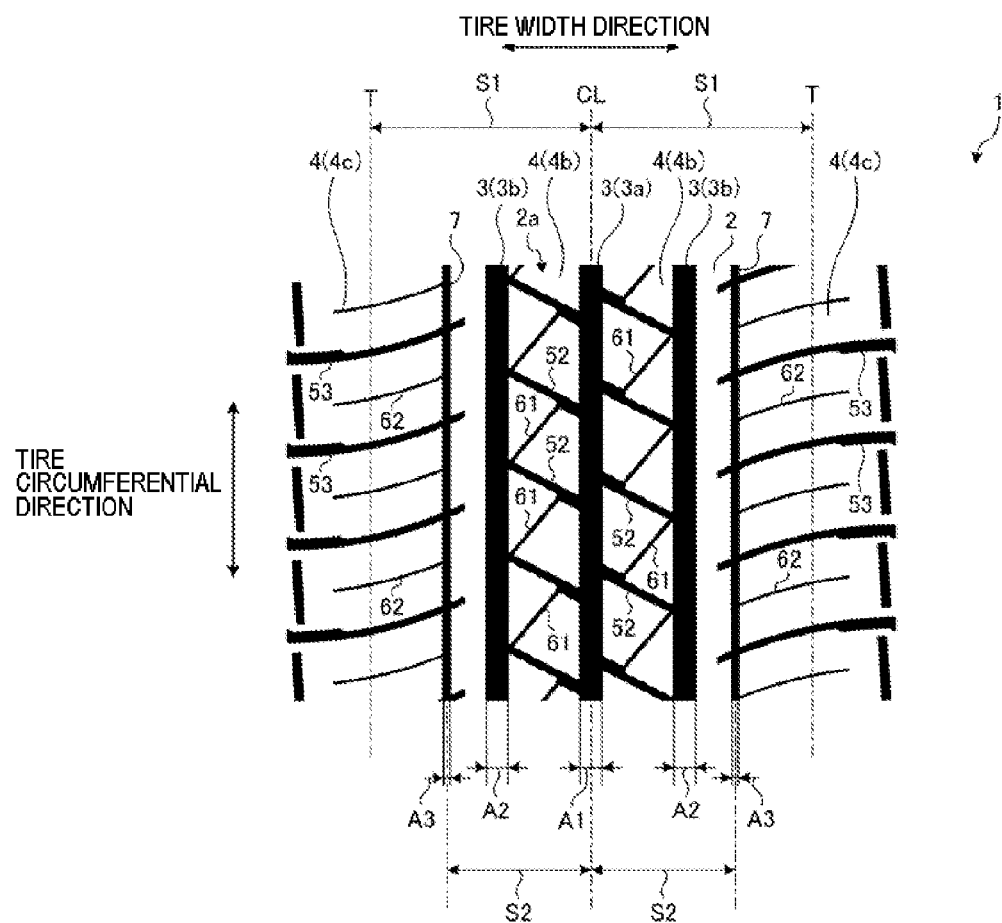
FIG. 2 is a plan view of another example of the pneumatic tire according to an embodiment of the present technology.
Figure 3:
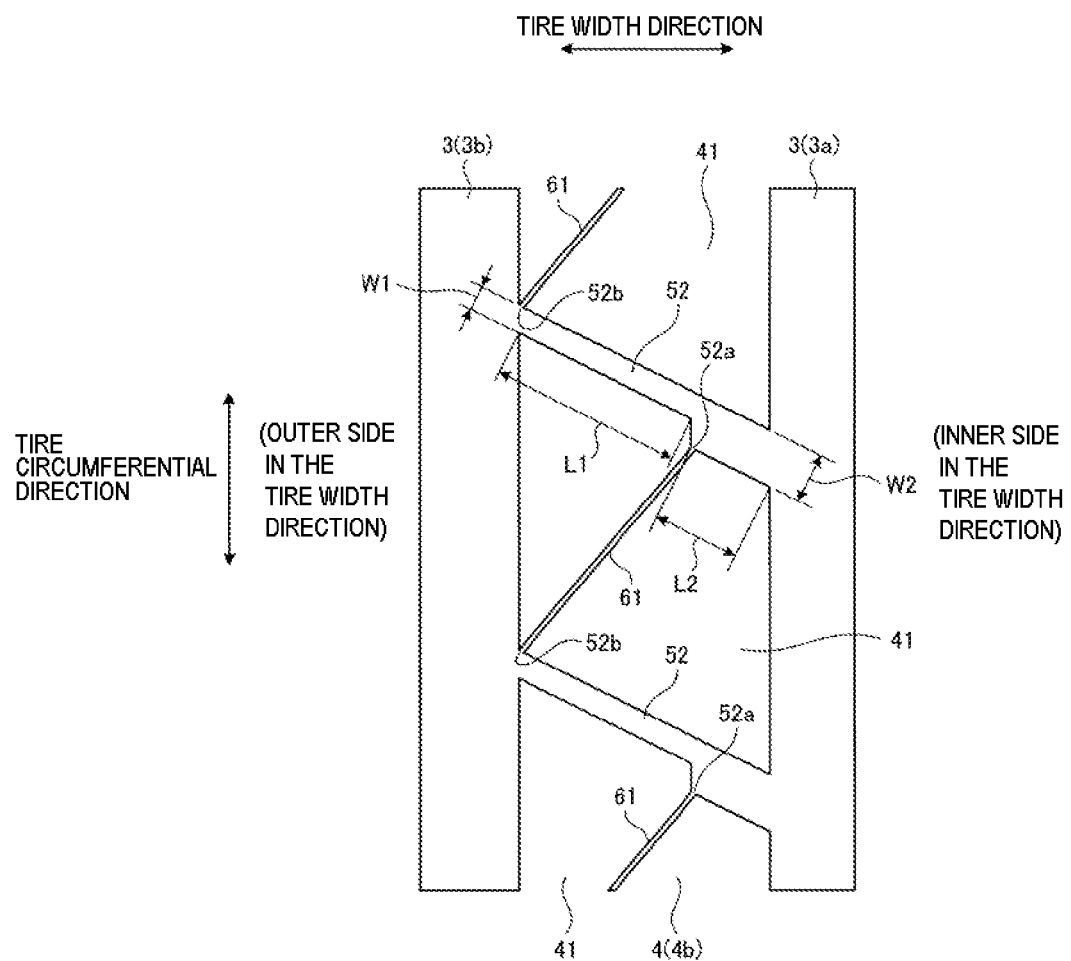
FIG. 3 is a partial enlarged plan view of the pneumatic tire illustrated in FIGS. 1 and 2.
Figure 4:
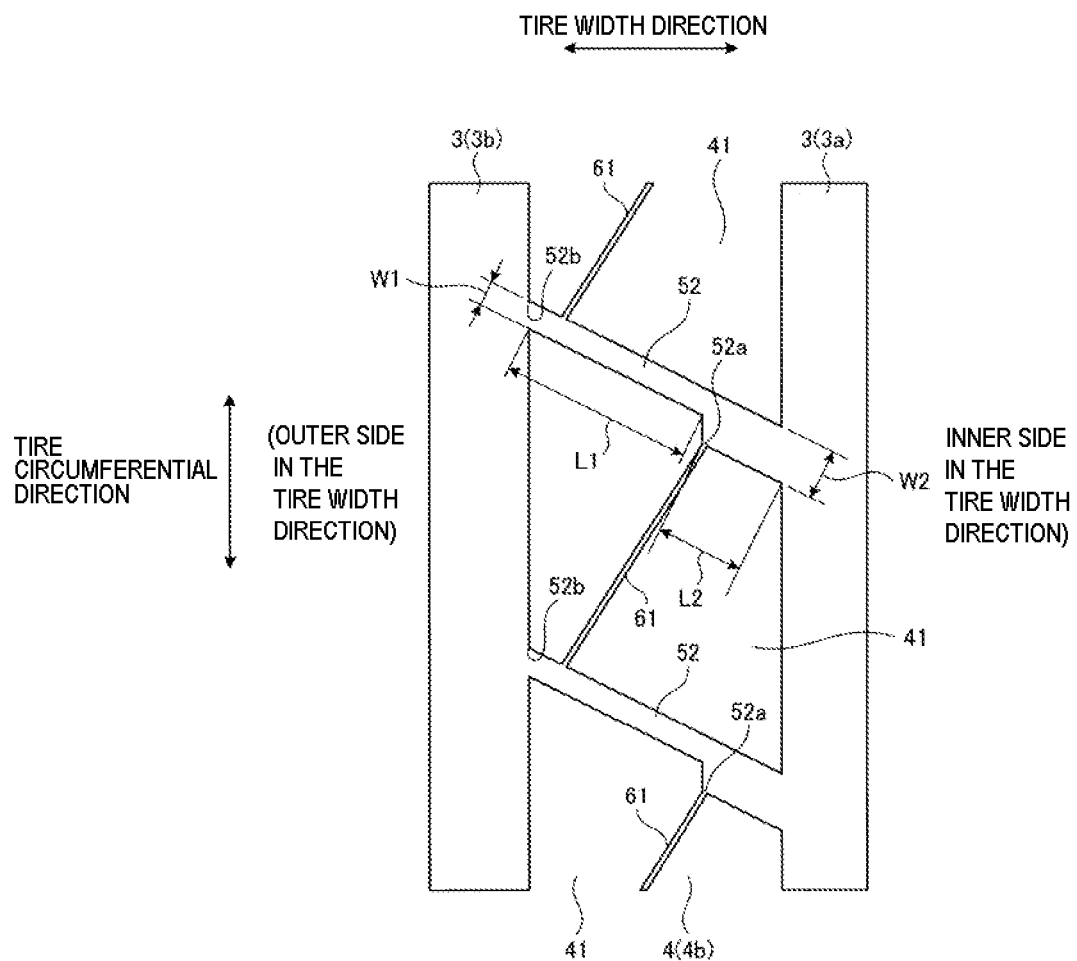
FIG. 4 is a partial enlarged plan view illustrating another example of the pneumatic tire according to an embodiment of the present technology.
Figure 5:
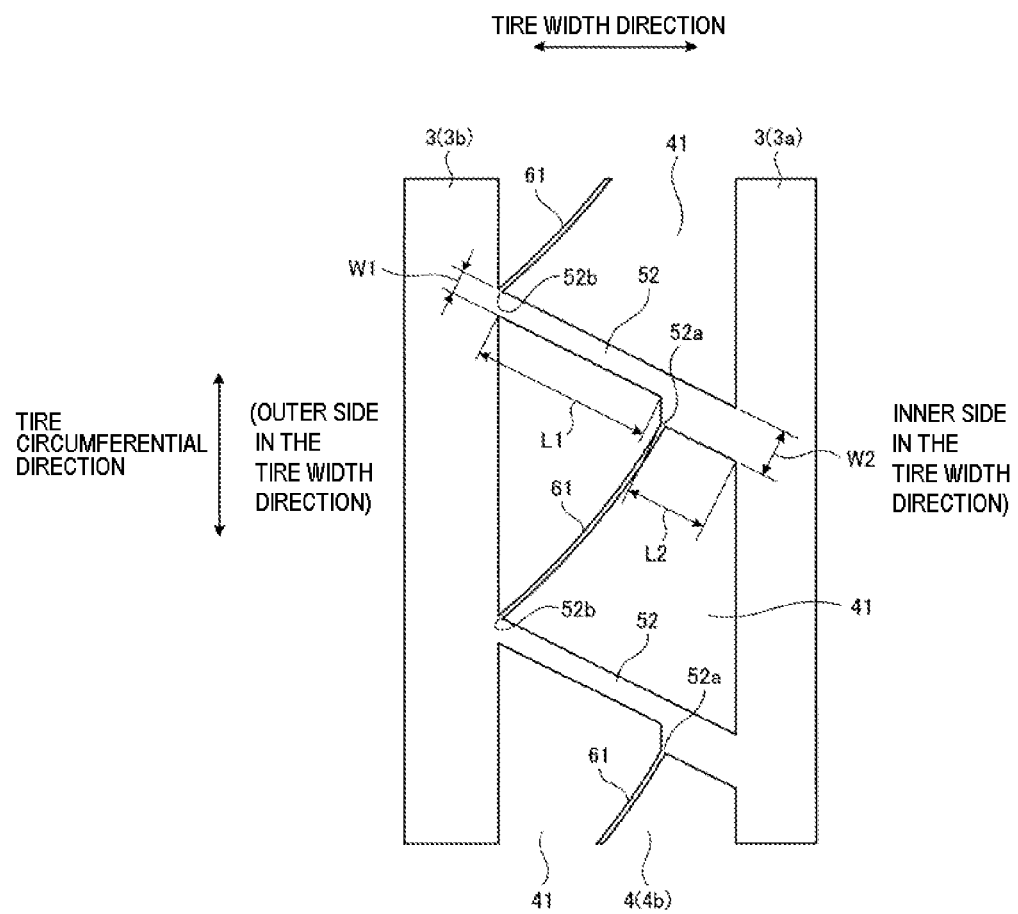
FIG. 5 is a partial enlarged plan view illustrating another example of the pneumatic tire according to an embodiment of the present technology.

FIGS. 1 and 2 are plan views of the pneumatic tire according to the embodiment, and FIG. 3 is a partial enlarged plan view of the pneumatic tire illustrated in FIGS. 1 and 2. FIGS. 4 and 5 are partial enlarged plan views illustrating another example of the pneumatic tire according to the embodiment.

In the following description, "tire radial direction" refers to a direction orthogonal to the rotational axis (not illustrated) of a pneumatic tire 1; "inner side in the tire radial direction" refers to the side facing the rotational axis in the tire radial direction; and "outer side in the tire radial direction" refers to the side distanced from the rotational axis in the tire radial direction. Additionally, "tire width direction" refers to the direction parallel to the rotational axis; "inner side in the tire width direction" refers to the side facing a tire equatorial plane (tire equator line) CL in the tire width direction; and "outer side in the tire width direction" refers to the side distanced from the tire equatorial plane CL in the tire width direction. Further, "tire circumferential direction" refers to a circumferential direction with the rotational axis as a center axis. Furthermore, "tire equatorial plane CL" refers to a plane that is orthogonal to the rotational axis of the pneumatic tire 1 and that passes through a center of a tire width of the pneumatic tire 1. "Tire equator line" refers to a line along the circumferential direction of the pneumatic tire 1 that lies on the tire equatorial plane CL. In this embodiment, "tire equator line" is given the same "CL" reference symbol as that used for the tire equatorial plane.

As illustrated in FIGS. 1 and 2, a pneumatic tire 1 according to the embodiment has a tread portion 2. The tread portion 2 is formed from a rubber material, is exposed on the outermost side in the tire radial direction of the pneumatic tire 1, and the surface thereof constitutes a profile of the pneumatic tire 1 as a tread surface 2a.

Further, the pneumatic tire 1 according to the embodiment has a symmetric tread pattern that is symmetric on both sides in the tire width direction about the tire equatorial plane CL. Specifically, the tread portion 2 includes a plurality of circumferential main grooves 3 that extend in the tire circumferential direction disposed in parallel in the tire width direction on the tread surface 2a. The circumferential main grooves 3 are an even number, four, in FIG. 1, and an odd number, three, in FIG. 2, with the central circumferential main groove 3 disposed on the tire equator line CL. Further, a plurality of rib-like land portions 4 is formed extending along the tire circumferential direction by the at least three circumferential main grooves 3 on the tread surface 2a of the tread portion 2. In FIG. 1 there are five rib-like land portions 4, with the center rib-like land portion 4 disposed on the tire equator line CL, and in FIG. 2 there are four.

Further, in the embodiment, as illustrated in FIGS. 1 and 2, the circumferential main groove 3 on the innermost side in the tire width direction is referred to as the center main groove 3a. Furthermore, the other circumferential main grooves 3 are referred to as the side main grooves 3b. In addition, as illustrated in FIG. 1, when the rib-like land portion 4 is on the tire equator line CL, the rib-like land portion 4 is referred to as the center rib-like land portion 4a. In FIG. 2, the circumferential main groove 3 (center main groove 3a) is on the tire equator line CL, so there is no center rib-like land portion 4a. Further, although not indicated on the drawings, the rib-like land portions 4 disposed between the center main groove 3a and the side main grooves 3b, or between the side main grooves 3b, are referred to as side rib-like land portions 4b. Further, the rib-like land portions 4 on the outermost side in the tire width direction that are not between the side main grooves 3b are referred to as shoulder rib-like land portions 4c.

On the tread surface 2a as illustrated in FIG. 1, the center rib-like land portion 4a includes a plurality of closed subsidiary grooves 51 provided at intervals in the tire circumferential direction, formed with a first end connecting to the center main groove 3a and a second end terminating within the center rib-like land portion 4a. The closed subsidiary grooves 51 are formed inclined with respect to the tire width direction. The orientation of the inclination of each closed subsidiary groove 51 is the same.

On the tread surface 2a as illustrated in FIGS. 1 to 3, the side rib-like land portions 4b include a plurality of connecting subsidiary grooves (subsidiary grooves) 52 provided at intervals in the tire circumferential direction, formed with their respective ends connecting to the center main groove 3a and the side main groove 3b. The side rib-like land portions 4b are divided in the tire circumferential direction by the connecting subsidiary grooves 52 to form block-like land portions 41.

The connecting subsidiary grooves 52 are formed inclined with respect to the tire width direction. The orientation of the inclination of each of connecting subsidiary grooves 52 is the same, and the opposite to that of the closed subsidiary grooves 51. As illustrated in FIG. 3, the groove width of the connecting subsidiary grooves 52 change midway. Specifically, the connecting subsidiary grooves 52 change in a step-like manner or an inclined manner between a narrow groove width W1 that connects to the circumferential main groove 3 (side main groove 3b) on the outer side in the tire width direction, and a broad groove width W2 that connects to the circumferential main groove 3 (center main groove 3a) on the inner side in the tire width direction. Further, the portion of the connecting subsidiary grooves 52 that changes in a step-like manner or an inclined manner between the groove width W1 and the groove width W2 may be on both sides of the groove width. Further, the relationship between the groove width W1 and the groove width W2 satisfies the range of $0.30 \leq W1/W2 \leq 0.70$. Further, in the connecting subsidiary grooves 52 as illustrated in FIG. 3, the relationship between the groove length L1 on the tread surface 2a having the region of groove width W1, and the groove length L2 on the tread surface 2a having the region of groove width W2 satisfies the range of 0.25≤L2/L1≤0.65.

Further, the block-like land portions 41 include sipes 61 formed with the respective end portions thereof connecting to contiguous connecting subsidiary grooves 52 on the tread surface 2a. The sipe 61 is provided with a first end thereof connecting to a broad width portion 52a where the groove width W1 of the connecting subsidiary groove 52 changes to the groove width W2, and with a second end connecting to a portion in the section of the connecting subsidiary groove 52 having the groove width W1 (the range of the groove length L1). In FIG. 3, the second end is provided connecting to an intersecting portion 52b that connects to the circumferential main groove 3 (side main groove 3b) in a section of the connecting subsidiary groove 52 having the groove width W1. Note that a single connecting subsidiary groove 52 connects to the first end and the second end of the sipes 61 on the both sides in the tire circumferential direction. That is, the first end of a sipe 61 and the first end of another sipe 61, or the second end of a sipe 61 and the second end of another sipe 61 do not connect to a single connecting subsidiary groove 52. In other words, each sipe 61 is provided inclined with respect to the tire width direction, and the orientation of the inclination is the same. Further, the orientation of the inclination of the sipes 61 is the opposite to that of the connecting subsidiary grooves 52.

Note that, in FIG. 4, the sipe 61 is provided so that a first end thereof connects to the broad width portion 52a where the groove width W1 of the connecting subsidiary groove 52 changes to the groove width W2, and a second end connects to the middle of a portion in the section of the connecting subsidiary groove 52 having the groove width W1 (the range of the groove length L1). Further, in FIG. 5, the sipe 61 is provided curved, bulging toward the side where the connecting subsidiary groove 52 has the groove width W2 (inner side in the tire width direction) so that the areas on the tread surface 2a of the block-like land portions 41 that are divided by the sipes 61 are approximated to each other. As illustrated in FIG. 5, the sipe 61 is provided so that a first end thereof connects to the broad width portion 52a where the groove width W1 of the connecting subsidiary groove 52 changes to the groove width W2, and a second end connects to the intersecting portion 52b that connects to the circumferential main groove 3 (side main groove 3b) in the section of the connecting subsidiary groove 52 having the groove width W1. However as illustrated in FIG. 4, the first end may connect to the broad width portion 52a where the groove width W1 of the connecting subsidiary groove 52 changes to the groove width W2, and the second end may connect to a portion in the section of the connecting subsidiary groove 52 having the groove width W1 (the range of the groove length L1).

As illustrated in FIGS. 1 and 2, on the tread surface 2a, the shoulder rib-like land portions 4c include circumferential narrow grooves 7 extending along the tire circumferential direction so that circumferential narrow grooves 7 are disposed adjacent to the side main grooves 3b on the outermost side in the tire width direction. Further, on the tread surface 2a, the shoulder rib-like land portions 4c include a plurality of shoulder subsidiary grooves 53 provided at intervals in the tire circumferential direction so that the end portion on the inner side in the tire width direction intersects the circumferential narrow groove 7 and terminates between the circumferential narrow groove 7 and the side main groove 3b on the outermost side in the tire width direction, and the end portion on the outer side in the tire width direction extends at an inclination with respect to the tire width direction beyond the ground contact edge T. Further, on the tread surface 2a, the shoulder rib-like land portions 4c include shoulder sipes 62 provided parallel to the shoulder subsidiary grooves 53 between the shoulder subsidiary grooves 53 disposed adjacent to each other so that the end portion on the inner side in the tire width direction connects to the circumferential narrow groove 7, and the end portion on the outer side in the tire width direction extends at an inclination with respect to the tire width direction beyond the ground contact edge T. Note that the orientation of the inclination of each shoulder subsidiary groove 53 is the same as that of each shoulder sipe 62, and the opposite to that of the connecting subsidiary grooves 52.

Here, the ground contact edge T refers to the two outermost edges in the tire width direction of the ground contact region, and in FIGS. 1 and 2, the ground contact edges T are continuously illustrated in the tire circumferential direction. The ground contact region refers to the region in which the tread surface 2a of the tread portion 2 of the pneumatic tire 1 comes into contact with the road surface when the pneumatic tire 1 is installed on a regular rim and inflated to a regular inner pressure, and 70% of the regular load is applied. Further, the spacing in the tire width direction between the ground contact edges T is set as the ground contact width TW.

"Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Further, "regular inner pressure" refers to "maximum air pressure" defined by JATMA, a maximum value described in "TIRE LOAD LIMITS AT VARIOUS COLD INFLATION PRESSURES" defined by TRA, or "INFLATION PRESSURES" defined by ETRTO. Note that "regular load" refers to "maximum load capacity" defined by JATMA, a maximum value described in "TIRE LOAD LIMITS AT VARIOUS COLD INFLATION PRESSURES" defined by TRA, or "LOAD CAPACITY" defined by ETRTO.

In this way, the pneumatic tire according to this embodiment includes, on the tread surface 2a of the tread portion 2, at least four rib-like land portions 4 extending in the tire circumferential direction formed by at least three circumferential main grooves 3 extending along the circumferential direction, and connecting subsidiary grooves 52 provided at intervals in the tire circumferential direction and connecting to the circumferential main grooves 3, forming block-like land portions 41 at least in the rib-like land portions 4 between the circumferential main groove 3 closest to the tire equator line CL and the circumferential main grooves 3 located adjacent to that circumferential main groove 3. The relationship between the groove width W1 that connects to the circumferential main groove 3 on the outer side in the tire width direction and the groove width W2 that connects to the circumferential main groove 3 on the inner side in the tire width direction satisfies the range of 0.30≤W1/W2≤0.70 and the relationship between the groove length L1 on the tread surface 2a having the region of groove width W1 and the groove length L2 on the tread surface 2a having the region of groove width W2 satisfies the range of 0.25≤L2/L1≤0.65, and sipes 61 are provided on the tread surface 2a of the block-like land portions 41, the respective ends of the sipe connecting to a position where the groove width W1 of the connecting subsidiary groove 52 changes to the groove width W2, and to a portion in the section of the connecting subsidiary groove 52 having the groove width W1 between the connecting subsidiary grooves 52 located adjacent to each other in the tire circumferential direction.

If the positions where the connecting subsidiary grooves 52 and the sipes 61 connect to the circumferential main grooves 3 are the same, vertices with a substantially triangular-shape are formed therein, so, due to the reduction in rigidity of the blocks in the vicinity of the positions, the steering stability performance tends to be reduced and, in addition, uneven wear tends to occur. The closer to the tire equator line CL, the more significant this is. According to the pneumatic tire 1 of this embodiment, the block rigidity can be increased by moving the position of connection of the end portion of the sipe 61 on the inner side in the tire width direction from the circumferential main groove 3 to the connecting subsidiary groove 52, so it is possible to provide a high level of steering stability performance and uneven wear resistance performance. Moreover, in the connecting subsidiary groove 52, the wet performance can be improved by making the groove width W2 connecting to the circumferential main groove 3 on the inner side in the tire width direction wider than the groove width W1. Furthermore, by making the groove width W1 connecting to the circumferential main groove 3 on the outer side in the tire width direction narrower than the groove width W2, the groove component on the outer side in the tire width direction is reduced, and thus the pass-by noise reduction performance can be improved.

Note that it is possible to obtain a significant effect of improvement in wet performance and pass-by noise reduction performance by more clearly defining the relationship between the groove widths W1, W2 as $0.40 \leq W1/W2 \leq 0.60$. Further, it is possible to obtain a significant effect of improvement in wet performance and pass-by noise reduction performance by more clearly defining the positions where the end portions of the sipes 61 connect as $0.35 \leq L2/L1 \leq 0.55$.

Further, in the pneumatic tire 1 according to this embodiment, preferably the relationship between the groove depth G1 of the circumferential main grooves 3 closest to the tire equator line CL and the groove depth D1 in the section of the connecting subsidiary grooves 52 having the groove width W1 satisfies the range of $0.30 \leq D1/G1 \leq 0.70$, and the relationship between the groove depth G1 of the circumferential main grooves 3 closest to the tire equator line CL and the groove depth D2 in the section of the connecting subsidiary grooves 52 having the groove width W2 satisfies the range of $0.50 \leq D2/G1 \leq 0.70$.

According to this pneumatic tire 1, by setting the groove depths D1, D2 of the connecting subsidiary grooves 52 shallower than that of the circumferential main grooves 3, the block rigidity is maintained, and it is possible to improve the steering stability performance and the uneven wear performance. By making the groove depths D1/G1 of the subsidiary grooves 52 and the circumferential main grooves 3 0.30 or more, and D2/G1 0.50 or more, the groove volume is made appropriate and it is possible to obtain an effect of improving wet performance. On the other hand, by making D1/G1 and D2/G1 0.70 or less, the reduction in block rigidity is suppressed and it is possible to obtain an effect of improving steering stability performance and uneven wear performance.

Further, in the pneumatic tire 1 according to this embodiment, the sipe 61 connects to the intersecting portion 52b that connects to the circumferential main groove 3 in the section of the connecting subsidiary groove 52 having the groove width W1, and preferably the relationship between the sipe depth H1 at the intersecting portion 52b of the sipe 61 and the groove depth G2 of the circumferential main groove 3 to which the sipe 61 connects satisfies the range of $0.15 \leq H1/G \leq 0.30$.

According to this pneumatic tire 1, by making H1/G2 0.15 or more, the water drainage characteristics are improved, so it is possible to obtain an effect of improving wet performance. On the other hand, by making H1/G2 0.30 or less, the reduction in block rigidity is suppressed and it is possible to obtain an effect of improving steering stability performance. Note that the sipe depth H1 may be changed toward the inner side in the tire width direction.

Further, in the pneumatic tire 1 according to this embodiment, the circumferential narrow groove 7 extending along the tire circumferential direction is formed between each circumferential main groove 3 on the outermost side in the tire width direction (side main groove 3b) and each ground contact edge T, and preferably the relationship between the distance S1 in the tire width direction from the tire equator line CL to the ground contact edge T and the distance S2 in the tire width direction from the tire equator line CL to the center of the circumferential narrow groove 7 satisfies the range of $0.7 \leq S2/S1 \leq 0.9$.

According to this pneumatic tire 1, by making S2/S1 within the above range, the proportion of the rib-like land portions 4 on the inner side in the tire width direction (center rib-like land portion 4a and side rib-like land portions 4b) in the ground contact width TW between the ground contact edges T is increased, so it is possible to achieve an effect of improving steering stability performance.

Further, in the pneumatic tire 1 according to this embodiment, the circumferential narrow groove 7 extending along the tire circumferential direction is formed between each circumferential main groove 3 on the outermost side in the tire width direction (side main groove 3b) and each ground contact edge T, and preferably the relationship between the groove width A1 of the circumferential main groove 3 closest to the tire equator line CL (center main groove 3a) and the groove width A2 of the circumferential main groove 3 (side main groove 3b) located on the outer side in the tire width direction of that circumferential main groove 3 satisfies the range of $1.05 \leq A2/A1 \leq 1.15$, and the relationship between the groove width A1 of the circumferential main groove 3 closest to the tire equator line CL and the groove width A3 of the circumferential narrow groove 7 satisfies the range of $0.20 \leq A3/A1 \leq 0.35$.

According to this pneumatic tire 1, the circumferential narrow groove 7 extending along the tire circumferential direction is formed between each circumferential main groove 3 on the outermost side in the tire width direction (side main groove 3b) and each ground contact edge T, so the water drainage characteristics are improved, and it is possible to obtain an effect of improving wet performance. Further, with obtaining the effect of improving wet performance due to the circumferential narrow groove 7, by making the groove width A2 of the circumferential main groove 3 located on the outer side in the tire width direction (side main groove 3b) greater than the groove width A1 of the circumferential main groove 3 closest to the tire equator line CL (center main groove 3a), the proportion of the rib-like land portions 4 on the inner side in the tire width direction (center rib-like land portion 4a and side rib-like land portions 4b) is increased without reducing the effect of improving wet performance, so it is possible to achieve an effect of improving steering stability performance.

Further, in the pneumatic tire 1 according to this embodiment, the rib-like land portion 4 (center rib-like land portion 4a) is provided on the tire equator line CL formed between the two circumferential main grooves 3 closest to the tire equator line CL (center main grooves 3a), and preferably the relationship between the land portion width B1 on the tread surface 2a of the rib-like land portion 4 and the groove width A1 of the circumferential main groove 3 closest to the tire equator line CL satisfies the range of 2.5≤B1/A1≤3.0.

According to this pneumatic tire 1, the rib-like land portion 4 (center rib-like land portion 4a) is provided formed between the two circumferential main grooves 3 closest to the tire equator line CL (center main grooves 3a), and by setting the land portion width B1 and the groove width A1 of the circumferential main grooves 3 on both sides of the land portion width B1 as prescribed in the above range, it is possible to achieve an effect of improving steering stability performance.

Further, preferably the pneumatic tire 1 according to this embodiment is applied to a pneumatic tire for a small truck with a regular inner pressure of 575 kPa or less.

Pneumatic tires for small trucks are mainly used for traveling on-site, and are subject to many repetitions of stop and go at medium and low velocities, so excellent steering stability performance, wear resistance performance, and wet performance are required, and excellent pass-by noise reduction performance is also required. According to this pneumatic tire 1, it is possible to improve the steering stability performance, uneven wear resistance performance, wet performance, and pass-by noise reduction performance, so it is ideal for pneumatic tires for small trucks.

EXAMPLES

In these working examples, performance tests were carried out for steering stability performance, wet performance (wet braking performance), uneven wear resistance performance, and pass-by noise reduction performance on a plurality of different types of pneumatic tires under different conditions (see FIGS. 6A-6C and FIGS. 7A-7C).

In these performance tests, pneumatic tires having a tire size of 205/70R15C 106/104S were assembled onto regular rims 15×6J, inflated to the regular inner pressure (front wheels 240 kPa, rear wheels 450 kPa), and fitted to a test vehicle (pickup truck with maximum load of 1 t).

The steering stability performance evaluation method was to evaluate the steering stability performance by sensory evaluation by experienced drivers for categories including straight ahead stability when the test vehicle was traveling straight at speeds in the range of 60 km/h to 120 km/h, and turning stability, rigidity feeling, and steering characteristics when changing lanes and cornering. Then, index evaluation with respect to a standard (100) which is assigned to Conventional Example 1 and Conventional Example 2 was conducted based on the sensory evaluation. In this evaluation, the greater the index, the better the steering stability performance is.

The wet performance evaluation method was to measure the braking distance of the test vehicle from an initial speed of 60 km/h on a test course having a wet road surface with a water depth of 10±1 mm. Then, index evaluation with respect to a standard (100) which is assigned to Conventional Example 1 and Conventional Example 2 was conducted based on the measuring results. In this evaluation, the greater the value, the better the wet performance is.

The uneven wear resistance performance evaluation method was to measure uneven wear (a difference in the amount of wear on the tread surface between the side rib-like land portions and the other rib-like land portions) that occurred on the rib-like land portions after the test vehicle traveled at an average speed of 60 km/h for 50,000 km. Then, index evaluation with respect to a standard (100) which is assigned to Conventional Example 1 and Conventional Example 2 was conducted based on the measuring results. In this evaluation, the greater the value, the better the uneven wear resistance performance is.

The pass-by noise reduction performance evaluation method was to measure the pass-by noise (noise outside the vehicle) when the test vehicle was traveling at 53 km/h on a test course having an ISO road surface. Then, index evaluation with respect to a standard (100) which is assigned to the measurement values (pass-by noise (dB)) of Conventional Example 1 and Conventional Example 2 was conducted. In this evaluation, the greater the value, the lower the pass-by noise, and the better the pass-by noise reduction performance is.

In FIGS. 6A-6C, pneumatic tires according to Conventional Example 1 and Working Examples 1 to 19 had four circumferential main grooves formed on the tread surface, and five rib-like land portions in which a rib-like land portion was disposed on the tire equator line, and rib-like land portions between the circumferential main grooves closest to the tire equator line and the circumferential main grooves adjacent to the former circumferential main grooves had subsidiary grooves provided at intervals in the tire circumferential direction that connected to each circumferential main groove, thereby forming block-like land portions (see FIG. 1). Further, in the pneumatic tire according to Conventional Example 1, the groove width of the subsidiary grooves was uniform, and the sipes connected to the main grooves and the subsidiary grooves. Further, the pneumatic tires according to Conventional Example 1 and Working Examples 1 to 11 did not have circumferential narrow grooves, and the pneumatic tires according to Working Examples 12 to 19 had circumferential narrow grooves. Further, the pneumatic tire according to Working Example 1 had sipes arranged in the form illustrated in FIG. 4, and Working Examples 2 to 19 had sipes arranged in the form illustrated in FIG. 3.

Further, in FIGS. 6A-6C, the pneumatic tires according to Working Examples 1 to 19 had the groove widths W1/W2 of the subsidiary grooves and the groove lengths L2/L1 of the subsidiary grooves in the prescribed range. The pneumatic tires according to Working Examples 6 to 19 had the groove depths D1/G1, D2/G1 of the subsidiary grooves and main grooves in the prescribed range. The pneumatic tires according to Working Examples 10 to 19 had the groove depths H1/G2 of the sipes and main grooves in the prescribed range. The pneumatic tires according to Working Examples 12 to 19 had the distances S2/S1 of the ground contact edges and narrow grooves in the prescribed range. The pneumatic tires according to Working Examples 14 to 19 had the groove widths A2/A1 of the main grooves and the groove widths A3/A1 of the narrow grooves and main grooves in the prescribed range. The pneumatic tires according to Working Examples 18 and 19 had the widths B1/A1 of the land portion and the main grooves in the prescribed range.

In FIGS. 7A-7C, the pneumatic tires according to Conventional Example 2 and Working Examples 20 to 36 had three circumferential main grooves formed on the tread surface, and four rib-like land portions in which a circumferential main groove was disposed on the tire equator line, rib-like land portions between the circumferential main groove closest to the tire equator line and the circumferential main grooves adjacent to the former circumferential main groove had subsidiary grooves provided at intervals in the tire circumferential direction that connected to each circumferential main groove, thereby forming block-like land portions (see FIG. 2). Further, in the pneumatic tire according to Conventional Example 2, the groove width of the subsidiary grooves was uniform, and the sipes connected to the main grooves and the subsidiary grooves. Further, the pneumatic tires according to Conventional Example 2 and Working Examples 20 to 30 did not have circumferential narrow grooves, and the pneumatic tires of Working Examples 31 to 36 had circumferential narrow grooves. Further, the pneumatic tire according to Working Example 20 had sipes arranged in the form illustrated in FIG. 4, and Working Examples 21 to 36 had sipes arranged in the form illustrated in FIG. 3.

Further, the pneumatic tires according to Working Examples 20 to 36 had the groove widths W1/W2 of the subsidiary grooves and the groove lengths L2/L1 of the subsidiary grooves in the prescribed range. The pneumatic tires according to Working Examples 25 to 36 had the groove depths D1/G1, D2/G1 of the subsidiary grooves and main grooves in the prescribed range. The pneumatic tires according to Working Examples 29 to 36 had the groove depths H1/G2 of the sipes and main grooves in the prescribed range. The pneumatic tires according to Working Examples 31 to 36 had the distances S2/S1 of the ground contact edges and narrow grooves in the prescribed range. The pneumatic tires according to Working Examples 33 to 36 had the groove widths A2/A1 of the main grooves and the groove widths A3/A1 of the narrow grooves and main grooves in the prescribed range.

As shown in the test results in FIGS. 6A-6C and 7A-7C, it can be seen that the pneumatic tires according to Working Examples 1 to 36 had improved steering stability performance, uneven wear resistance performance, wet performance, and pass-by noise reduction performance.

What is claimed is:

1. A pneumatic tire including, on a tread surface of a tread portion, at least four rib-like land portions extending in a tire circumferential direction formed by at least three circumferential main grooves extending along the tire circumferential direction, and subsidiary grooves provided at intervals in the tire circumferential direction and connecting to each of the circumferential main grooves, forming block-like land portions at least in the rib-like land portions between the circumferential main groove closest to a tire equator line and the circumferential main groove located adjacent to said circumferential main groove, wherein a groove width of the subsidiary grooves changes midway, a relationship between a groove width (W1) of a first opening of the subsidiary groove with respect to the circumferential main groove on an outer side in a tire width direction and a groove width (W2) of a second opening of the subsidiary groove with respect to the circumferential main groove on an inner side in the tire width direction satisfies a range of $0.30 \leq W1/W2 \leq 0.60$, a relationship between a groove length (L1) on the tread surface having a region of the groove width (W1) and a groove length (L2) on the tread surface having a region of the groove width (W2) satisfies a range of $0.25 \leq L2/L1 \leq 0.65$, and sipes are provided on the tread surface of the block-like land portions, respective end portions of the sipes connecting to a position where the groove width (W1) of the subsidiary groove changes to the groove width (W2), and to a portion in a section of the subsidiary groove having the groove width (W1) between the subsidiary grooves located adjacent to each other in the tire circumferential direction; and a relationship between a groove depth (G1) of the circumferential main groove closest to the tire equator line and a groove depth (D1) in the section of the subsidiary groove having the groove width (W1) satisfies a range of $0.30 \leq D1/G1 \leq 0.70$, and a relationship between the groove depth (G1) of the circumferential main groove closest to the tire equator line and a groove depth (D2) in a section of the subsidiary groove having the groove width (W2) satisfies a range of $0.50 \leq D2/G1 \leq 0.70$.

2. The pneumatic tire according to claim 1, wherein the sipe connects to an intersecting portion connecting to the circumferential main groove in the section of the subsidiary groove having the groove width (W1), and a relationship between a sipe depth (H1) of the sipe at the intersecting portion and a groove depth (G2) of the circumferential main groove to which the sipe connects satisfies a range of $0.15 \leq H1/G2 \leq 0.30$.

3. The pneumatic tire according to claim 2, wherein a circumferential narrow groove extending along the tire circumferential direction is formed between each of the circumferential main grooves on an outermost side in the tire width direction and each ground contact edge, and a relationship between a distance (S1) in the tire width direction from the tire equator line to the ground contact edge and a distance (S2) in the tire width direction from the tire equator line to a center of the circumferential narrow groove satisfies a range of $0.7 \leq S2/S1 \leq 0.9$.

4. The pneumatic tire according to claim 3, wherein a circumferential narrow groove extending along the tire circumferential direction is formed between each of the circumferential main grooves on the outermost side in the tire width direction and each ground contact edge, and a relationship between a groove width (A1) of the circumferential main groove closest to the tire equator line and a groove width (A2) of the circumferential main groove located on the outer side in the tire width direction of said circumferential main groove satisfies a range of $1.05 \leq A2/A1 \leq 1.15$, and a relationship between the groove width (A1) of the circumferential main groove closest to the tire equator line and a groove width (A3) of the circumferential narrow groove satisfies a range of $0.20 \leq A3/A1 \leq 0.35$.

5. The pneumatic tire according to claim 4, wherein a rib-like land portion is provided on the tire equator line, formed between the two circumferential main grooves closest to the tire equator line, and a relationship between a land portion width (B1) on the tread surface of the rib-like land portion and the groove width (Al) of the circumferential main groove closest to the tire equator line satisfies a range of $2.5 \leq B1/A1 \leq 3.0$.

6. The pneumatic tire according to claim 5, wherein the pneumatic tire is a small truck tire with a regular inner pressure of 575 kPa or less.

7. The pneumatic tire according to claim 2, wherein a circumferential narrow groove extending along the tire circumferential direction is formed between each of the circumferential main grooves on the outermost side in the tire width direction and each ground contact edge, and a relationship between a groove width (Al) of the circumferential main groove closest to the tire equator line and a groove width (A2) of the circumferential main groove located on the outer side in the tire width direction of said circumferential main groove satisfies a range of $1.05 \leq A2/A1 \leq 1.15$, and a relationship between the groove width (Al) of the circumferential main groove closest to the tire equator line and a groove width (A3) of the circumferential narrow groove satisfies a range of $0.20 \leq A3/A1 \leq 0.35$.

8. The pneumatic tire according to claim 2, wherein a rib-like land portion is provided on the tire equator line, formed between the two circumferential main grooves closest to the tire equator line, and a relationship between a land portion width (B1) on the tread surface of the rib-like land portion and the groove width (A1) of the circumferential main groove closest to the tire equator line satisfies a range of $2.5 \leq B1/A1 \leq 3.0$.

9. The pneumatic tire according to claim 2, wherein the pneumatic tire is a small truck tire with a regular inner pressure of 575 kPa or less.

10. The pneumatic tire according to claim 1, wherein a circumferential narrow groove extending along the tire circumferential direction is formed between each of the circumferential main grooves on an outermost side in the tire width direction and each ground contact edge, and a relationship between a distance (S1) in the tire width direction from the tire equator line to the ground contact edge and a distance (S2) in the tire width direction from the tire equator line to a center of the circumferential narrow groove satisfies a range of $0.7 \leq S2/S1 \leq 0.9$.

11. The pneumatic tire according to claim 1, wherein a circumferential narrow groove extending along the tire circumferential direction is formed between each of the circumferential main grooves on the outermost side in the tire width direction and each ground contact edge, and a relationship between a groove width (A1) of the circumferential main groove closest to the tire equator line and a groove width (A2) of the circumferential main groove located on the outer side in the tire width direction of said circumferential main groove satisfies a range of $1.05 \leq A2/A1 \leq 1.15$, and a relationship between the groove width (A1) of the circumferential main groove closest to the tire equator line and a groove width (A3) of the circumferential narrow groove satisfies a range of $0.20 \leq A3/A1 \leq 0.35$.

12. The pneumatic tire according to claim 1, wherein a rib-like land portion is provided on the tire equator line, formed between the two circumferential main grooves closest to the tire equator line, and a relationship between a land portion width (B1) on the tread surface of the rib-like land portion and the groove width (A1) of the circumferential main groove closest to the tire equator line satisfies a range of $2.5 \leq B1/A1 \leq 3.0$.

13. The pneumatic tire according to claim 1, wherein the pneumatic tire is a small truck tire with a regular inner pressure of 575 kPa or less.

14. The pneumatic tire according to claim 1, wherein D1 and D2 are different.

15. The pneumatic tire according to claim 1, wherein D2>D1.

16. A pneumatic tire including, on a tread surface of a tread portion, at least four rib-like land portions extending in a tire circumferential direction formed by at least three circumferential main grooves extending along the tire circumferential direction, and subsidiary grooves provided at intervals in the tire circumferential direction and connecting to each of the circumferential main grooves, forming block-like land portions at least in the rib-like land portions between the circumferential main groove closest to a tire equator line and the circumferential main groove located adjacent to said circumferential main groove, wherein a groove width of the subsidiary grooves changes midway, a relationship between a groove width (W1) of a first opening of the subsidiary groove with respect to the circumferential main groove on an outer side in a tire width direction and a groove width (W2) of a second opening of the subsidiary groove with respect to the circumferential main groove on an inner side in the tire width direction satisfies a range of $0.30 \leq W1/W2 \leq 0.70$, a relationship between a groove length (L1) on the tread surface having a region of the groove width (W1) and a groove length (L2) on the tread surface having a region of the groove width (W2) satisfies a range of $0.25 \leq L2/L1 \leq 0.65$, and sipes are provided on the tread surface of the block-like land portions, respective end portions of the sipes connecting to a position where the groove width (W1) of the subsidiary groove changes to the groove width (W2), and to a portion in a section of the subsidiary groove having the groove width (W1) between the subsidiary grooves located adjacent to each other in the tire circumferential direction; and a relationship between a groove depth (G1) of the circumferential main groove closest to the tire equator line and a groove depth (D1) in the section of the subsidiary groove having the groove width (W1) satisfies a range of $0.30 \leq D1/G1 \leq 0.70$, and a relationship between the groove depth (G1) of the circumferential main groove closest to the tire equator line and a groove depth (D2) in a section of the subsidiary groove having the groove width (W2) satisfies a range of $0.50 \leq D2/G1 \leq 0.70$, and wherein D2>D1.

* * * * *